United States Patent [19]
Harding

[11] Patent Number: 5,966,177
[45] Date of Patent: Oct. 12, 1999

[54] IMAGE DISPLAY APPARATUS

[75] Inventor: John Robert Harding, East Sussex, United Kingdom

[73] Assignee: SEOS Displays Limited, United Kingdom

[21] Appl. No.: 09/021,232

[22] Filed: Feb. 10, 1998

[30] Foreign Application Priority Data

Feb. 12, 1997 [GB] United Kingdom .................. 9702833

[51] Int. Cl.⁶ ....................................................... H04N 5/66
[52] U.S. Cl. ........................ 348/383; 348/806; 348/807; 345/1; 345/903
[58] Field of Search .................................. 348/744, 745, 348/746, 747, 806, 807, 36, 383; 345/1, 903

[56] References Cited

U.S. PATENT DOCUMENTS

| | | | |
|---|---|---|---|
| 4,974,073 | 11/1990 | Inova | 348/38 |
| 5,136,390 | 8/1992 | Inova et al. | 348/383 |
| 5,396,257 | 3/1995 | Someya et al. | 345/1 |
| 5,771,072 | 6/1998 | Tokoro et al. | 348/383 |

FOREIGN PATENT DOCUMENTS

| | | |
|---|---|---|
| 0 739 131 A1 | 10/1996 | European Pat. Off. . |
| 0 739 133 A1 | 10/1996 | European Pat. Off. . |
| 01046523 | 9/1990 | Japan . |

*Primary Examiner*—Andrew I. Faile
*Assistant Examiner*—Sam Huang
*Attorney, Agent, or Firm*—Iandiorio & Teska

[57] ABSTRACT

Image display apparatus (2) comprising at least one display projector for displaying an image, signal generator means for generating a control signal for controlling the intensity of the image, modulator means (4, 6) for generating a modulation waveform for modulating the intensity of the image, and adjustor means (8, 10) for adjusting the modulation waveform to improve the performance of the modulation waveform at various image intensities, the image display apparatus being such that it uses different modulation waveforms for various image intensities, it uses a proportion of at least one modulation waveform in dependence upon the control signal, and it uses the resultant modulation waveform to modulate the control signal.

9 Claims, 4 Drawing Sheets

IMAGE DISPLAY APPARATUS

FIELD OF THE INVENTION

This invention relates to image display apparatus, for example to large field of view image display apparatus that may be used in flight, vehicle, marine and leisure simulators.

DESCRIPTION OF RELATED ART

Large field of view image display apparatus often comprises a number of display projectors, each projecting an image on to a single screen. These images are arranged in such a way that they appear as one overall image to the user. Where one image joins its neighbour, a technique called blending is typically used. Each image is positioned so that it overlaps the neighbouring image and, within the overlap region, one image is progressively faded out whilst the other image is progressively faded in, such that at any one point within the overlap region, the contribution from each image, when added together, equals that of a single image. Hence, the intensity of the overall image at any point in the overlap region should be equal to that of the image on either side of the overlap region for a given image intensity.

In some types of image display apparatus, more than two images may be overlapped at any one point in the overall image. Typically, four single images may overlap at their corners in very large field of view display apparatus. The same technique of fading the single images is used to form one continuous image of the correct intensity throughout the overlap region. This blending technique is normally performed by modulating a video signal to the display apparatus. Hence, a modulation waveform is generated and this is multiplied with the video signal. This operation may either be formed within the display projector itself, or within a separate apparatus. Where the operation is within the separate apparatus, then the apparatus may be capable of performing the modulation of the video signals to a single display projector, or to a number of display projectors.

The waveform generated to modulate the video signal must take into account the response of the image display apparatus, to the video signal, in order that the combined image from all display projectors form an overall image of the correct intensity in the overlap region. The response of the image display apparatus is typically non-linear and has what is known as a gamma function. The non-linearity in the display projector response adversely affects the final image display.

BRIEF SUMMARY OF THE INVENTION

It is an aim of the present invention to obviate or reduce the above mentioned problem.

Accordingly, the present invention provides image display apparatus comprising at least one display projector for displaying an image, video signal generator means for generating a video control signal for the display projector, modulator means for modulating the video control signal for the display projector, modulation waveform generator means, and adjustor means for adjusting the modulation waveform for improving the performance of the modulation waveform at various image intensities, the image display apparatus being such that it uses different modulation waveforms for various image intensities, and the adjustor means being such that it selects a proportion of each modulation waveform in dependence upon the amplitude of the control signal from the video signal generator means, and it uses the resultant modulation waveform to modulate the control signal.

The image display apparatus of the intention compensates for non-linearity in the display projector response. The image display apparatus is able to work well with display projectors having various non-linear characteristics. If the image display apparatus is a non-linear response (video signal versus intensity of image on the display) then the modulation waveform should be adjusted, in dependence upon the amplitude of the video signal into the display projector. This is especially so where a good quality blend is required between two or more single images.

The image display apparatus may include selector means for selecting a proportion of more than one image modulation signal, the selector means being controlled by the control signal for the image display apparatus. The control signal may be a drive signal. The drive signal may be a video drive signal.

The image display apparatus may be a monochrome or colour image display apparatus.

The image display apparatus may comprise a single display projector, or a plurality of the display projectors.

The image display apparatus may be one in which the modulation waveform is used for blending multiple single display images together. Alternatively, the image display apparatus may be one in which the modulation waveform is used to modify modulation waveforms used for other purposes, for example a colour shading waveform for boosting the intensity of the image in an area of the display, perhaps to compensate for the reduced intensity of an image towards its extremes.

The image display apparatus may be one in which the signal generator means and the modulator means are provided in the display projector.

The image display apparatus may be one in which the display apparatus is such that it is able to adjust the modulation waveform for a single or multiple display projector.

The image display apparatus may be one in which the image display apparatus selects a proportion of each modulation waveform in dependence upon the control signal. Alternatively, the image display apparatus may be one in which the image display apparatus combines 100% of one modulation waveform wit a proportion of another modulation waveform.

BRIEF DESCRIPTION OF THE DRAWINGS

An embodiment of the invention will now be described solely by way of example and with reference to the accompanying drawings in which.

DETAILED DESCRIPTION OF THE DRAWINGS

Figure 1:
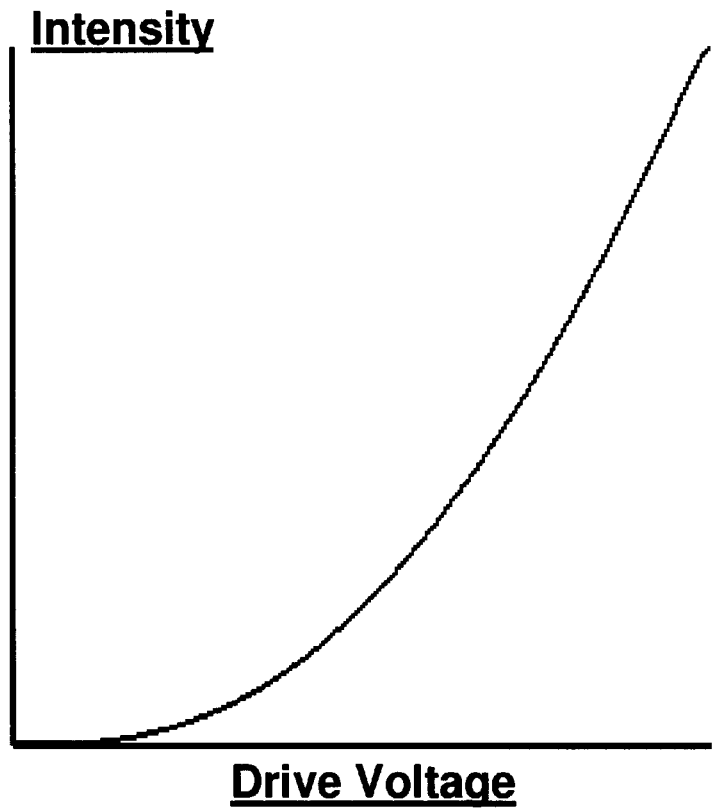
FIG. 1 shows the response of a sample display projector from black to peak white.

Referring to FIG. 1, the waveform generated to modulate the video signal must take into account the response of the image display apparatus to the video signal, in order that the combined image from all display projectors forms an overall image of the correct intensity in the overlap region. The response of known image display apparatus is typically nonlinear and has what is known as the above mentioned gamma function. The response of a known display projector having this typical non-linear response and the gamma function is shown in FIG. 1.

Figure 2:
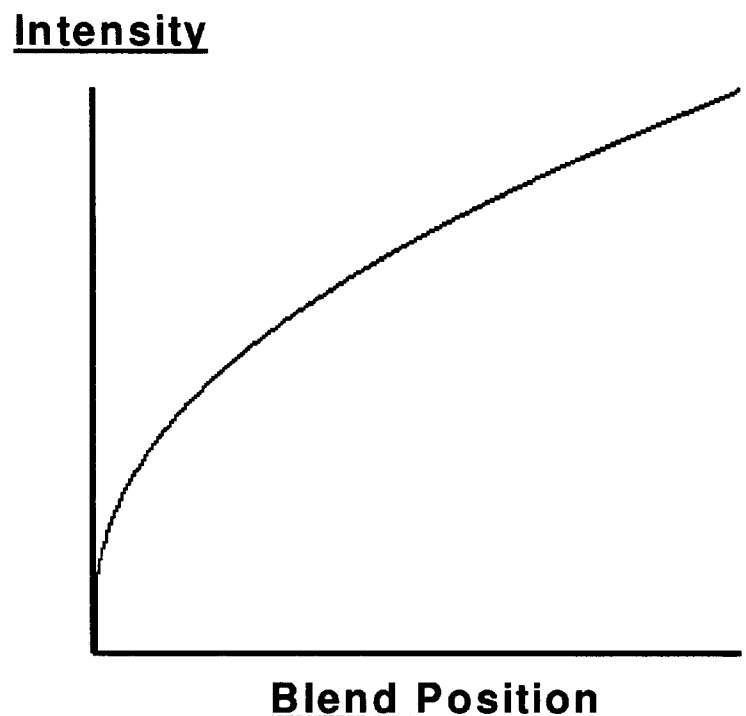
FIG. 2 shows the possible shape of a modulation waveform to blend two images together for the sample display projector referred to in FIG. 1.

FIG. 2 shows the possible shape of a modulation waveform to blend two images together for the display projector shown in FIG. 1. The modulation waveform shown in FIG. 2 is based on the inverse of FIG. 1. Thus the modulation waveform shown in FIG. 2 assumes that the image display apparatus is modulating the image from peak white to black, ie the complete image is peak white in the blend region. This will not always be the case.

Figure 3:
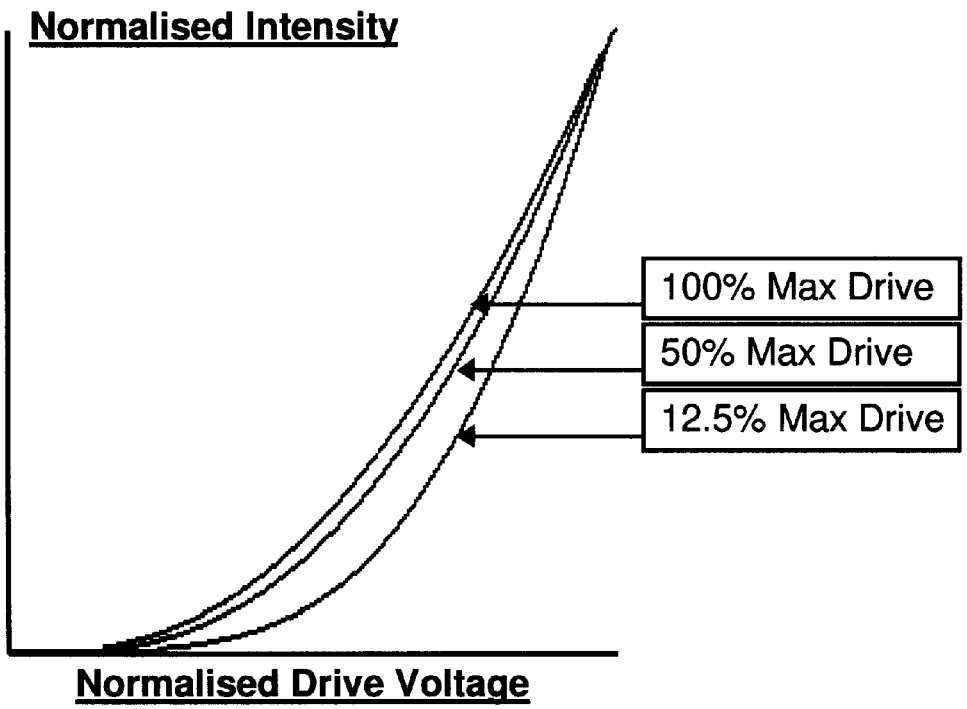
FIG. 3 shows the response of a display projector at different drive levels.

FIG. 3 shows the response of a display projector at different drive levels. More specifically, FIG. 3 shows the response of the display projector used in FIG. 1 from black up to 100%, 50% and 12.5% of its peak white drive level.

Figure 4:
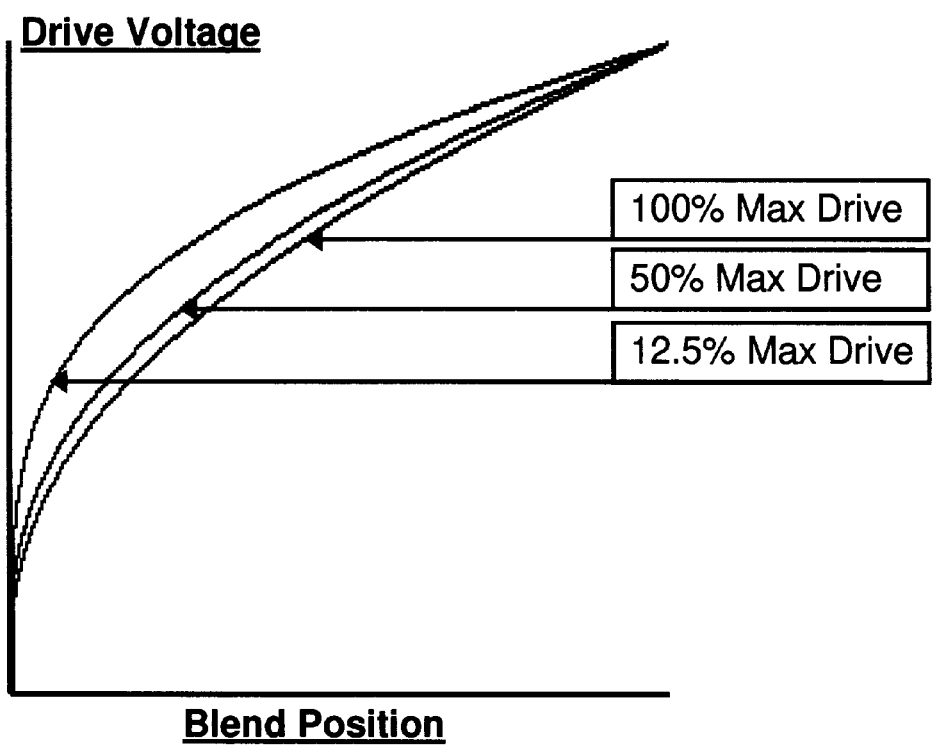
FIG. 4 shows blend modulation waveforms for different drive levels.

FIG. 4 shows blend modulation waveforms for different drive levels. More specifically, FIG. 4 shows the required shape of a modulation waveform in each of the cases envisaged for FIG. 3. The exact shape is not critical. When a number of single images are overlapped, then at any one point in the overlap region, the sum of all the single images should produce the same intensity as if it had been one large continuous image.

Figure 5:
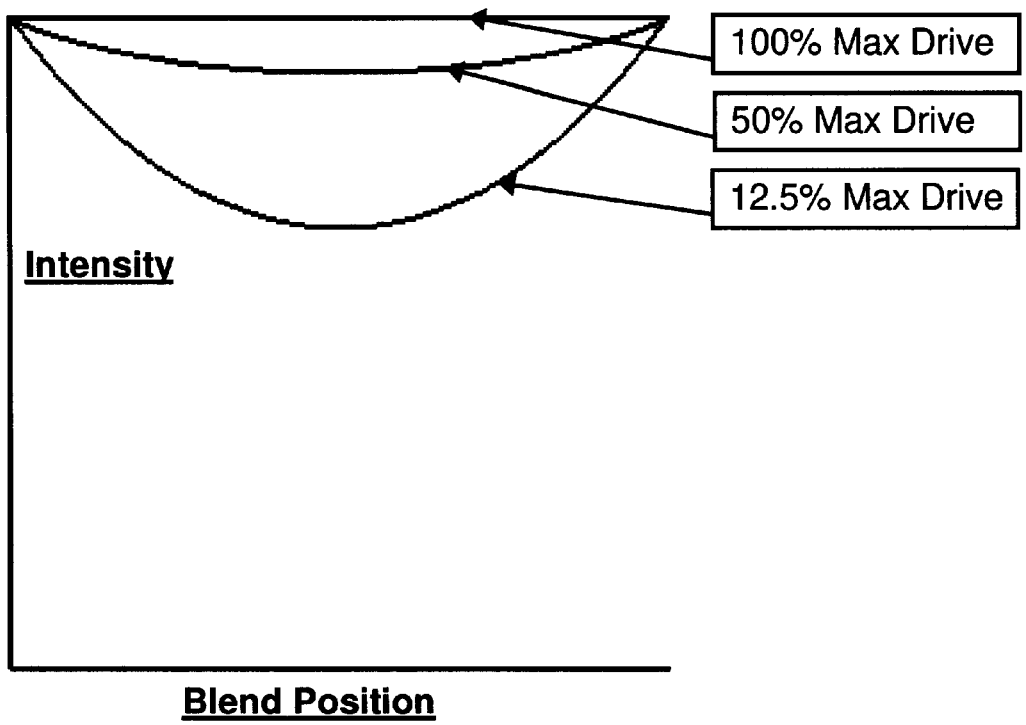
FIG. 5 shows a blend intensity profile using one blend modulation waveform at different drive levels.

If the image overlap region is modulated by a modulation waveform based on the image display apparatus operating at 100% peak white drive level, then it may be questioned what happens when the image display apparatus actually operates at lower drive levels, for example when the image being projected is grey. FIG. 5 shows the intensity through the overlap region when the 100% drive modulation waveform is used; but the image display apparatus is actually operated not only at 100%, but also at 50% and 12.5% drive levels. In the cases of the 50% and the 12.5% drive levels, there is a droop in intensity of the image through the overlap region.

In order to partially overcome the above mentioned problem referred to with reference to FIG. 5, the image display apparatus could be set upon with a compromise modulation waveform, for example the 50% Max Drive curve of FIG. 4. The compromised modulation waveform could be one that caused peaking of intensity of the blends of bright images, and drooping in intensity in the blends of darker images. Users may also be able to compensate for this effect using one modulation waveform for bright images and changing to another for dark images. However, this does not work well in many images where there are both bright and dark areas of image, for example with an image containing bright areas of sky and dark areas of land or sea. Another complication is that the image (and hence areas of dark and bright image) are moving in many applications, so that a technique of using different modulation waveforms for fixed areas would not work very well.

It is known to use a digital system in which a number of look up tables are used and selected according to scene brightness. This digital system works reasonably well and it uses a number of look up tables for different image intensities. Each look up table contains the characteristic of the image display apparatus for different image intensities. The look up table is used to modify the modulation waveform to match the image display apparatus. The video drive signal to the image display apparatus is sampled by an analog to digital converter and the output from the analog to digital converter is used to select the appropriate look up table. The samples are taken many times per horizontal video line and these samples are used to select the appropriate look up table for the next video line. Applying the samples to the next line avoids any lag or offsets, introduced by the sampling time. Alternatively, samples could have been applied on the next video frame had a larger sample memory been used.

The known digital system using the look up tables has problems. More specifically, a large quantity of electronics is required to achieve the required solution. Also, the quantity of data required to be stored in the look up tables is very large and, for example, there may be eight look up tables for each colour. The performance of the known digital systems is limited by the number of samples taken along each line. Ideally, a sample would be taken and the appropriate look up table selected for each pixel in the display's image, but this would however require a lot of complex electronics.

The image display apparatus of the present invention overcomes the problems mentioned above and is also able to vary the length of the modulation wave form dependent upon the signal drive signal to the image display apparatus. This is achieved with very little electronic circuitry. One method of operation of the image display apparatus of the present invention assumes a linear interpolation (dependent upon signal drive level) between the modulation wave form required for 100% signal drive level and 0% drive level would achieve approximately the correct signal drive level. In such a method, there are two correction waveforms, one for 0% video drive and one for 100% video drive. A fader then selects a proportion of each correction waveform, dependent on video drive levels. An alternative method of operation of the image display apparatus of the present invention is where there is one correction waveform, for example for 0% video drive, and there is a second waveform which when added to (or subtracted from) the correction waveform, will give the required waveform at 100% video drive. A fader then add (or subtracts) a proportion of the second waveform to the correction waveform, dependent on the video drive level.

Figure 7:
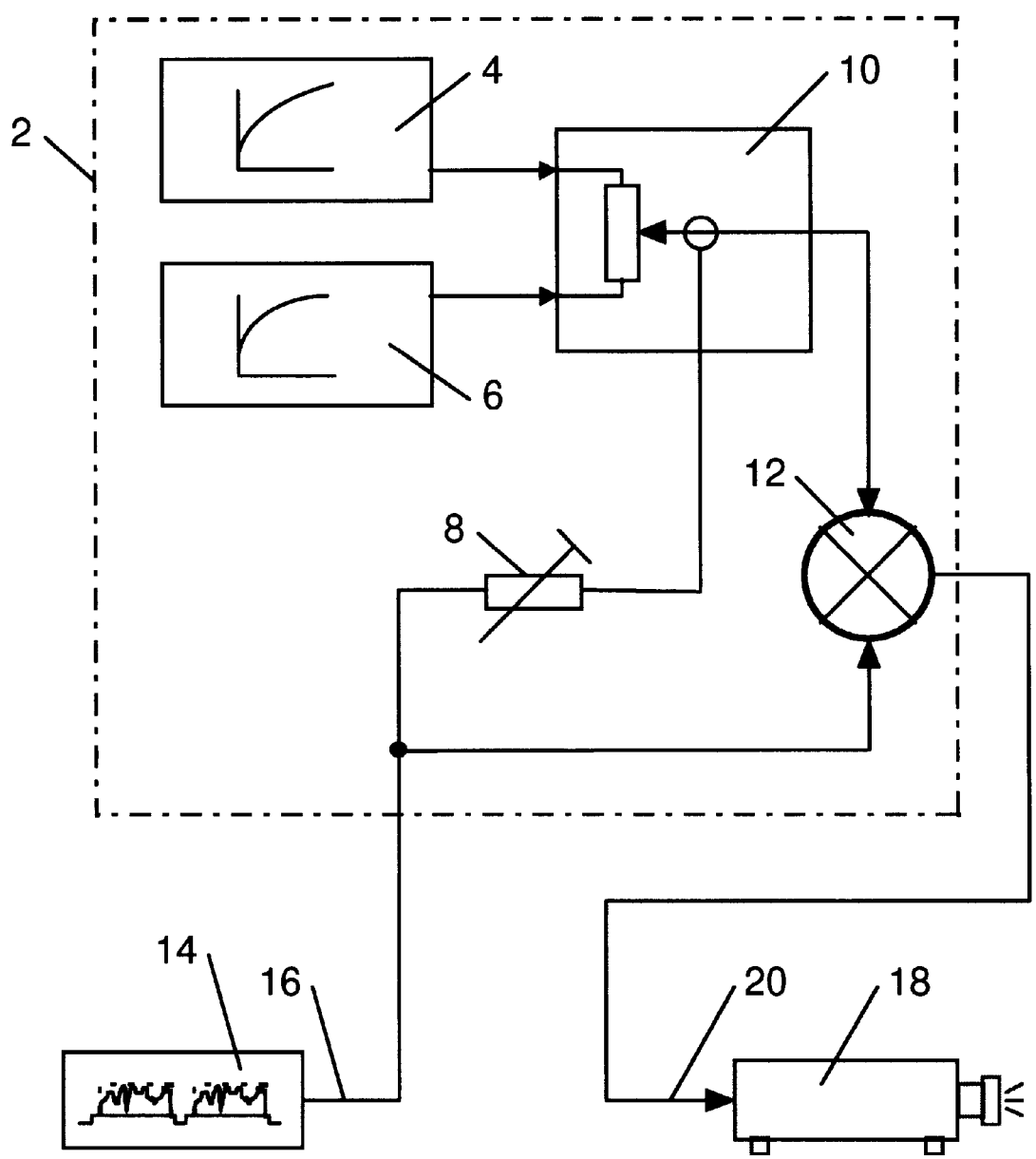
FIG. 7 shows the image display apparatus of the present invention.

Referring now to FIG. 7, there is shown image display apparatus 2 of the present invention. The image display apparatus 2 comprises a modulation wave form generator 4 for 100% video drive, and a modulation wave form generator 6 for 0% video drive. The image display apparatus 2 also comprises a variable gain device 8, a video signal fader 10, and a video multiplier 12. FIG. 7 only shows one path and the stated parts 4, 6, 8, 10, 12 would typically be duplicated for each colour, that is for red, green and blue.

The modulation waveform generators 4, 6 provide the correct waveforms for the brightest and for the dark image. The modulation wave form generators 4, 6 may be digital circuits with digital to analog converters. Alternatively, the modulation waveform generators 4, 6 may be entirely analog circuits. Typically, the modulation waveform generators 4, 6 would share the majority of their circuitry, and would only have different output stages.

A video drive signal from a signal generator 14 is fed along video input line 16 to the variable gain device 8. The video drive signal is adjusted to ensure that black (zero intensity on a display screen) will set the video signal fader 10 to one extreme, and that white (full/peak intensity on the display screen) will set the video signal fader 10 to the other extreme. The variable gain device may be fixed resistors, variable resistors or some electronic gain control means.

The normalised video input from the variable gain device 8 is used to control the video signal fader 10. Thus, dependent upon the video signal drive level, a proportion of each modulation wave form will be selected to ensure a correct modulation waveform for the video drive level at that point on the display screen.

The output from the video signal fader 10 modulates the video signal to a display projector 18, using the video multiplier 12. The video output from the video multiplier 12 passes along line 20 to the display projector 18. The video signal fader 10 and the video multiplier 12 may typically be integrated circuits.

Figure 6:
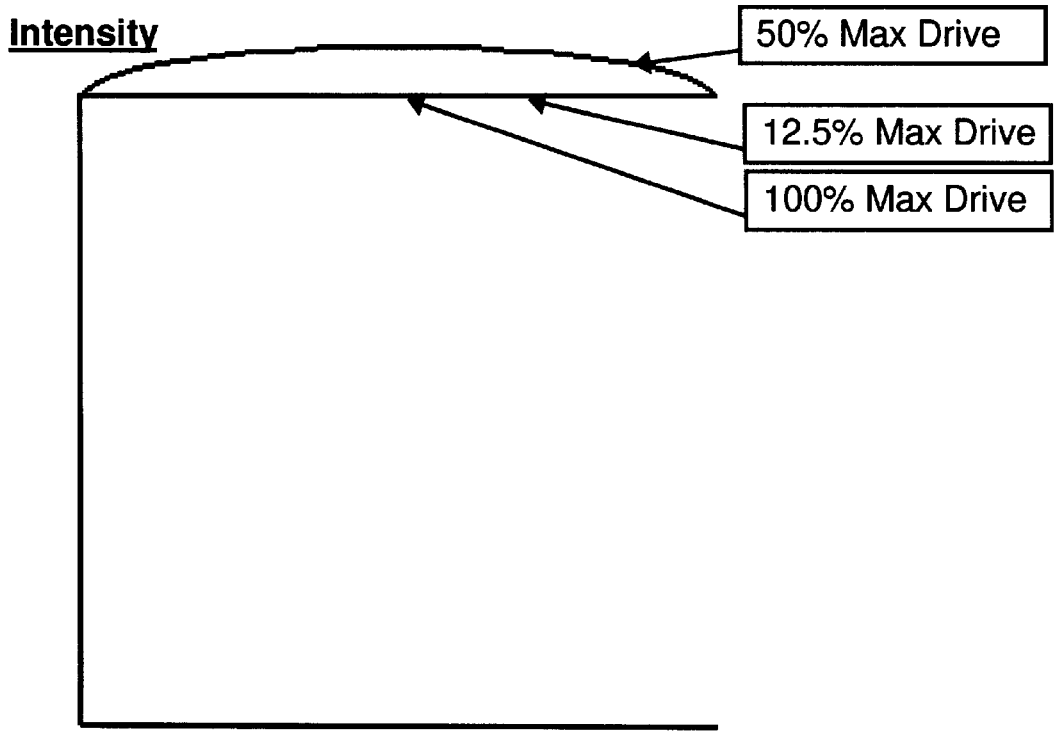
FIG. 6 shows a blend intensity profile using the modulation waveform from the image display apparatus of the present invention at different drive levels.

The response of the circuit for video drive levels at 100%, 50% and 12.5% is shown in FIG. 6. If FIG. 6 is compared with FIG. 5, it will be seen that there is a marked improvement. FIG. 6 results from using a modulation wave form based on 12.5% drive level rather than 0% for the dark modulation waveform generator.

The image display apparatus of the present invention has the following advantages.
1. Instantaneous response.
2. Works with both static and moving images.
3. Works with dark, bright and mixed intensity images with no user adjustment once calibrated.
4. Works with small or large areas of intensity changes.
5. Requires very little circuitry or other means to implement.
6. Is reasonably straightforward to calibrate.

The required calibration may be such that the variable gain device 8 is set up using an oscilloscope or similar. Alternatively, if test modulation waveforms replace the operational modulation waveforms, then a set up by eye may be made with reference to image on the display.

There may be just two modulation waveforms or alternatively there may be more than two modulation waveforms. For example, there may be one modulation waveform for each of red, green and blue. The modulation waveforms may be pre-set approximating to the known characteristics of the image display apparatus. Alternatively, the modulation waveforms may be variable to allow a user to optimise them for the actual characteristics of the image display apparatus. In this latter case, grey scale images or a number of uniform images at various video drive levels may be used to optimise the modulation waveforms.

It is to be appreciated that the embodiment of the invention described above with reference to the accompanying drawings has been given by way of example and that modifications may be effected. Thus, the description with reference to the drawings applies the technique of modulation waveforms for blending a number of small images to produce one large seamless image. If desired however the modulation waveform technique could equally well be applied to any display modulation waveform, for example one for boosting the intensity of the image in one area of a display and for reducing it in another area of display.

I claim:

1. Image display apparatus comprising at least one display projector for displaying an image, video signal generator means for generating a video control signal for the display projector, modulator means for modulating the video control signal for the display projector, modulation waveform generator means, and adjustor means for adjusting the modulation waveform for improving the performance of the modulation waveform at various image intensities, the image display apparatus being such that it uses different modulation waveforms for various image intensities, and the adjustor means being such that it selects a proportion of each modulation waveform in dependence upon the amplitude of the control signal from the video signal generator means, and it uses the resultant modulation waveform to modulate the control signal.

2. Image display apparatus according to claim 1 and including selector means for selecting a proportion of more than one image modulation signal, the selector means being controlled by the control signal.

3. Image display apparatus according to claim 1 in which the image display apparatus is a monochrome or a colour image display apparatus.

4. Image display apparatus according to claim 1 in which the modulation waveform is used for blending multiple single display images together.

5. Image display apparatus according to claim 1 in which the modulation waveform is used to modify other modulation waveforms.

6. Image display apparatus according to claim 1 in which the signal generator means and the modulator means are provided in the display projector.

7. Image display apparatus according to claim 1 in which the display projector is such that it is able to adjust the modulation waveform for a signal or multiple display projector.

8. Image display apparatus according to claim 1 in which the image display apparatus selects a proportion of each modulation waveform in dependence upon the control signal.

9. Image display apparatus according to claim 1 in which the image display apparatus combines 100% of one modulation waveform with a proportion of another modulation waveform.

* * * * *